United States Patent
Cabaret et al.

(10) Patent No.: US 8,656,313 B2
(45) Date of Patent: Feb. 18, 2014

(54) AIRCRAFT DISPLAY SYSTEM

(75) Inventors: Remi Cabaret, Toulouse (FR); David Jean, Castanet Tolosan (FR); Nicolas Roux, Castelnau d'Estretefonds (FR)

(73) Assignee: Airbus Operations SAS, Toulouse (FR)

( * ) Notice: Subject to any disclaimer, the term of this patent is extended or adjusted under 35 U.S.C. 154(b) by 844 days.

(21) Appl. No.: 12/118,494

(22) Filed: May 9, 2008

(65) Prior Publication Data

US 2008/0282201 A1 Nov. 13, 2008

(30) Foreign Application Priority Data

May 10, 2007 (FR) .................................... 07 03340

(51) Int. Cl.
G06F 3/048 (2013.01)
G05D 1/00 (2006.01)

(52) U.S. Cl.
USPC ............... 715/856; 715/754; 715/755; 701/3

(58) Field of Classification Search
USPC ................. 715/754, 755, 856, 859; 701/3
See application file for complete search history.

(56) References Cited

U.S. PATENT DOCUMENTS

| | | | |
|---|---|---|---|
| 5,340,061 A | 8/1994 | Vaquier | |
| 5,777,615 A * | 7/1998 | Barber et al. | 715/856 |
| 5,956,019 A * | 9/1999 | Bang et al. | 345/173 |
| 6,094,608 A | 7/2000 | Bomans | |
| 6,112,141 A | 8/2000 | Briffe | |
| 6,381,519 B1 * | 4/2002 | Snyder | 701/3 |
| 6,784,869 B1 * | 8/2004 | Clark et al. | 345/156 |
| 7,113,167 B2 | 9/2006 | Roux | |
| 2002/0118166 A1 | 8/2002 | Roux | |
| 2008/0231634 A1 * | 9/2008 | Gyde et al. | 345/427 |

FOREIGN PATENT DOCUMENTS

| | | |
|---|---|---|
| EP | 1 207 451 | 5/2002 |
| EP | 1 235 138 | 8/2002 |
| FR | 2 677 149 | 12/1992 |
| FR | 2 743 921 | 7/1997 |
| FR | 2 821 445 | 8/2002 |

OTHER PUBLICATIONS

Greenberg, Saul. "Personalizable groupware: Accommodating individual roles and group differences." ECSCW '91: Proceedings of the Second European Conference on Computer-Supported Cooperative Work. Kluwer Academic Publishers. Sep. 1991. pp. 17-31.*
Preliminary Search Report dated Nov. 27, 2007 w/ English translation.

* cited by examiner

Primary Examiner — Kieu Vu
Assistant Examiner — Blaine Basom
(74) Attorney, Agent, or Firm — Dickinson Wright PLLC

(57) ABSTRACT

A display system manages the states of two cursors that are situated on an interactive window of a display screen, as a function of the last actions carried out by the crew.

3 Claims, 4 Drawing Sheets

AIRCRAFT DISPLAY SYSTEM

BACKGROUND OF THE INVENTION

The present invention relates to a display system, in particular a head-down display system, which is mounted in the flight deck of an aircraft, in particular of a transport airplane.

This display system is of the type comprising:
at least one interactive window which can be viewed on at least one screen and which comprises at least one sensitive object associated with a particular function;
a cursor management device;
a means of managing the display which is carried out on said interactive window;
a first cursor control device which is capable of being actuated by a first pilot of the aircraft and which comprises:
  at least one actuatable movement means, capable of moving a first cursor over said interactive window so as to designate a sensitive object; and
  at least one actuatable validation means, capable of validating a sensitive object which is designated by way of said first cursor so as to execute the function which is associated with said sensitive object; and
a second cursor control device which is capable of being actuated by a second pilot of the aircraft and which comprises:
  at least one actuatable movement means, capable of moving a second cursor over said interactive window so as to designate a sensitive object; and
  at least one actuatable validation means, capable of validating a sensitive object which is designated by way of said second cursor so as to execute the function which is associated with said sensitive object.

Within the framework of the present invention:
the expression "execution of a function" is understood to mean in particular:
  a implementation of a control of an element (engine, lighting, etc.) of the aircraft or of a particular action;
  a data input;
  access to information pages on a screen; and/or
  access to information or complementary actions without changing page; and
the expression "interactive window" is understood to mean a window which comprises sensitive objects (points, ranges, alphanumeric values, lists, menus, etc.) which are associated respectively with particular functions of the aforesaid type and which are sensitive to the presence of a cursor. Said cursor can be moved by a movement means (such as aforesaid) which is actuatable by an operator of the aircraft, so as to be able to be brought onto a sensitive object so as to designate it or mark it. When a sensitive object is designated, that is to say when the cursor is brought onto it, said sensitive object is marked or brought to the fore, in particular by a change of appearance such as a change of color or a highlighting for example. Said sensitive object is then said to be furnished with an "object marker" or "focus". The validation (with the aid of an actuatable validation means such as aforesaid) of a sensitive object which is furnished with such an object marker triggers the execution of the function which is associated with said sensitive object.

DESCRIPTION OF THE PRIOR ART

Various dialog devices capable of designating and validating a sensitive object of the aforesaid type are known (FR-2 677 149 or FR-2 743 921).

Additionally, it is known that, increasingly often, certain interactive windows which are situated on the central screens of the flight deck, are common to the pilot and to the copilot, and require interactive access by these two pilots, it being possible for the crew's task to be managed alternately or in a concurrent manner by the pilot and/or the copilot. Thus, at a given instant, the cursor controlled by the pilot and the cursor controlled by the copilot can be allocated simultaneously to the same interactive window. It is then necessary, in particular for interaction consistency reasons and in order to avoid confusion, to manage the concurrence of use of these two cursors on the same interactive window.

Document U.S. Pat. No. 6,112,241 discloses a display system which comprises two cursor movement devices which are each capable of controlling a particular cursor and which are intended for two different operators (the pilot and the copilot of the aircraft for example). Except for the case where the two cursors designate the same sensitive object (in this case it is the control of the cursor that designated this sensitive object first which prevails), no priority is given to one or other of the pilots so that the two pilots can designate and validate simultaneously different sensitive objects of the same interactive window. Such a possibility entails risks of confusion and of error of interpretation between the various actions carried out by the pilot and the copilot and risks of inconsistency relating to the controlled operations. Such freedom of action can be dangerous for the safety of the flight, in particular when the interactive window, access to which is common to the two cursors, relates to functions, for example piloting functions, which act directly on the flight of the aircraft and on its immediate safety.

Additionally, document FR-2 821 445 (or U.S. Pat. No. 7,113,167) discloses a device for dialog between an operator of an aircraft and a system of the aircraft, which allows the operator, in particular a pilot of the aircraft, to control the execution of an emergency function if necessary, even if at this moment he is currently executing another (routine or non-routine) function. This dialog device comprises:
  at least one screen capable of depicting at least two sensitive objects on at least two interactive windows, each of said sensitive objects being associated with one of a plurality of functions; and
  at least one cursor control device which is arranged so as to be able to be actuated by said operator and which comprises at least:
    an actuatable movement means, capable of moving a cursor over a window so as to designate a sensitive object while revealing a main object marker; and
    an actuatable validation means, capable of validating a sensitive object which is furnished with said main object marker so as to execute the function which is associated with said sensitive object; and
  auxiliary control means which are arranged so as to also be able to be actuated by said operator, which are intended to control an auxiliary object marker, without acting on the control of said main object marker, and which comprise:
    at least one actuatable movement element, making it possible to generate a discrete movement of said auxiliary object marker, sensitive object by sensitive object, over an interactive window; and
    at least one actuatable validation element, making it possible to validate a sensitive object which is furnished with said auxiliary object marker so as to execute the function associated with said sensitive object.

Thus, when during the execution of a particular function [which has been controlled in a routine manner by designating and validating a sensitive object by way of said cursor control device controlling the main object marker (or cursor)], another function, in particular an emergency function, must be executed, the operator (who accesses said cursor control device and said auxiliary control means at one and the same time) can trigger the execution of this other function by way of said auxiliary control means, since the auxiliary object marker (or cursor) which is controlled by the latter means does not act on the control carried out by way of the main object marker (or cursor). Consequently, the second function (an emergency function for example) can be executed without the operator having to interrupt the ongoing execution of the first function (routine function envisaged in advance for example). The two executions are consequently controlled by the same operator.

This previous document FR-2 821 445 therefore does not relate to the cursor controls, which are carried out by different operators, but the possibility of one and the same operator controlling, in addition to the routine cursor, an auxiliary cursor which is intended for emergency situations. For this purpose, this previous document simply envisages the possibility of executing, at the same instant, different functions controlled by the two cursors. It therefore permits the auxiliary cursor to be able to also be controlled during routine control of the main cursor. This previous document does not therefore envisage any management of the concurrence of use of the two cursors on an interactive window and therefore does not make it possible to remedy the aforesaid drawbacks.

SUMMARY OF THE INVENTION

The present invention relates to a display system for an aircraft, in particular for a transport airplane, which makes it possible to remedy the aforesaid drawbacks.

For this purpose, according to the invention, said display system of the type comprising:
  at least one interactive window which can be viewed on at least one screen and which comprises at least one sensitive object associated with a particular function;
  a cursor management device which comprises a first means which is capable of bringing a cursor into one of the following states:
    an unallocated state, for which the corresponding cursor is not situated on the interactive window considered; and
    an active state, for which the cursor is situated on the interactive window, it can be moved over this interactive window, and it can validate a designated sensitive object;
  at least one means of managing the display which is carried out on said interactive window;
  a first cursor control device which is capable of being actuated by a first pilot of the aircraft and which comprises:
    at least one actuatable movement means, capable of moving a first cursor over said interactive window so as to designate a sensitive object; and
    at least one actuatable validation means, capable of validating a sensitive object which is designated by way of said first cursor so as to execute the function which is associated with said sensitive object; and
  a second cursor control device which is capable of being actuated by a second pilot of the aircraft and which comprises:
    at least one actuatable movement means, capable of moving a second cursor over said interactive window so as to designate a sensitive object; and
    at least one actuatable validation means, capable of validating a sensitive object which is designated by way of said second cursor so as to execute the function which is associated with said sensitive object,
is noteworthy in that said cursor management device comprises:
  at least said first means which is controllable and which is capable of bringing each of said first and second cursors into one of the following states:
    an unallocated state;
    an active state;
    a standby state, for which the corresponding cursor is situated on the interactive window, it can be moved over this interactive window, and it can validate a designated sensitive object, but only after having been brought into the active state by an actuation of the corresponding cursor control device; and
    an inactive state, for which the corresponding cursor is situated on the interactive window, but it cannot validate a designated sensitive object; and
  at least one second means:
    which is associated with said first means and controls said first means relating to the respective states of said first and second cursors, when they are both situated on the same interactive window;
    which comprises a memory for recording the last actions carried out on said cursor control devices;
    which controls said first means while taking account of said last actions carried out and recorded and of predetermined rules; and
    which controls said first means so that one of said cursors and one only is on each occasion in the active state when they are both situated on the same interactive window.

Thus, by virtue of the invention, the cursor management device makes it possible to manage the concurrence of use of two cursors when these two cursors (which are controlled by two different pilots of the aircraft) are situated simultaneously on one and the same interactive window. Moreover, as specified below, this management of the concurrence of use of the two cursors is particularly advantageous since it takes account of the last actions carried out on the cursor control devices and of predetermined (control) rules.

Consequently, the display system in accordance with the invention makes it possible to avoid the risk of confusion and of inconsistency of interaction which exists on the aforesaid routine display systems.

Accordingly, the present invention envisages in particular, in addition to the routine unallocated and active states, a standby state and an inactive state.

Preferably, said display system comprises a plurality of interactive windows, and said second means manages the respective states of said first and second cursors each time that they simultaneously lie on one and the same interactive window of the display system.

Of course, within the framework of the present invention, said cursor management device brings a cursor into one of the following states: the active state and the standby state, when this cursor is the only one that lies on an interactive window.

Additionally, in a preferred embodiment, said second means takes account of the following rules:
  the first cursor is brought to the active state:

if it is placed on an interactive window and the second cursor is not in the active state on this interactive window;

if it is in the standby state and the corresponding cursor control device is actuated;

if it is in the inactive state and the corresponding cursor control device is actuated, while the second cursor is not in the active state;

the first cursor is brought to the inactive state:

if it is placed on an interactive window and the second cursor is already in the active state on this interactive window;

if it is in the standby state and the second cursor is brought to the active state; and the first cursor is brought to the standby state:

if it is in the active state and the corresponding cursor control device is not actuated for a predetermined duration;

if it is in the inactive state and the second cursor is removed from the interactive window.

Furthermore, in a particular embodiment, said display system comprises a plurality of screens, some of which are intended for the first pilot of the aircraft and are capable of receiving said first cursor, some others of which are intended for the second pilot of the aircraft and are capable of receiving said second cursor, and yet others of which are common to said first and second pilots and are capable of receiving at one and the same time said first cursor and said second cursor, and each of said screens comprises at least one interactive window.

The figures of the appended drawing will clearly elucidate the manner in which the invention can be carried out. In these figures, identical references designate similar elements.

DESCRIPTION OF PREFERRED EMBODIMENTS

Figure 1:
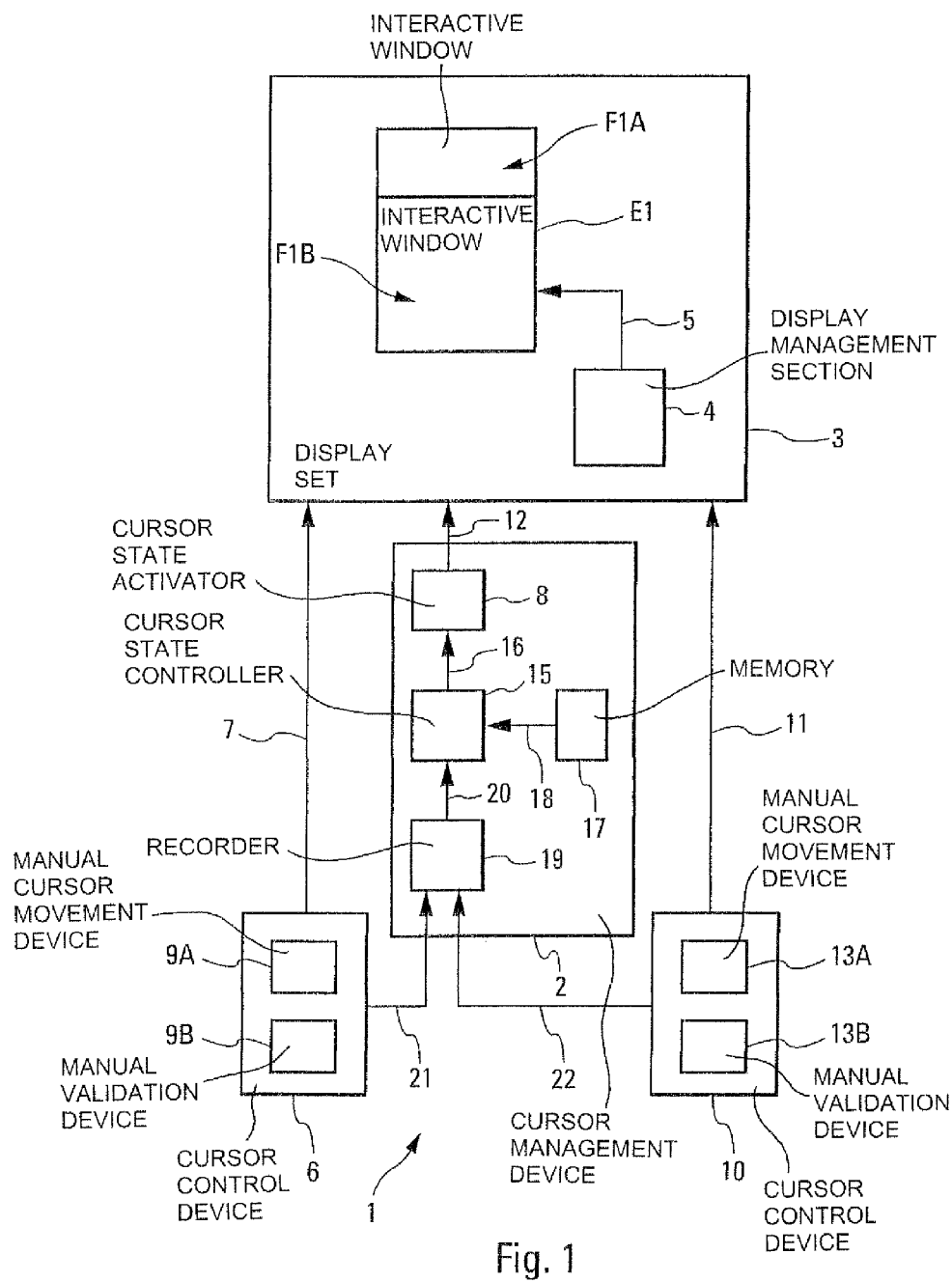
FIG. 1 is the schematic diagram of a display system in accordance with the invention.

The display system 1 in accordance with the invention and schematically represented in FIG. 1 is on board an aircraft, in particular a civil transport airplane, not represented, and is, preferably, arranged in the flight deck of this aircraft. This display system 1 can, in particular, be intended to allow dialog between at least one operator of the aircraft, in particular a pilot, and an embedded routine system (not represented), for example a flight management system.

Said display system 2 is of the type comprising:

a display set 3 which comprises at least one interactive window F1A, F1B. This interactive window F1A, F1B can be viewed on at least one screen E1 and comprises at least one sensitive object (not represented) associated with a particular function, specified below;

a cursor management device 2 which comprises a means 8 which is capable of bringing a cursor into one of the following states:

an unallocated state ET1, for which the corresponding cursor is not situated on the interactive window F1A, F1B considered; and an active state ET2, for which the cursor is situated on the interactive window F1A, F1B, it can be moved over this interactive window F1A, F1B, and it can validate a designated sensitive object, as specified below;

at least one routine means 4 for managing the display which is carried out on the interactive window F1A, F1B, this means 4 being connected by way of a link 5 to said screen E1;

a cursor control device 6 which is connected by way of a link 7 to said display set 3, which is capable of being actuated by a first pilot of the aircraft, for example the controlling pilot, and which comprises:

at least one actuatable movement means 9A, capable of moving a first cursor over said interactive window F1A, F1B so as to designate a sensitive object (not represented); and at least one actuatable validation means 9B, capable of validating a sensitive object which is designated by way of said first cursor so as to execute the function which is associated with this sensitive object; and a cursor control device 10 which is connected by way of a link 11 to said display set 3, which is capable of being actuated by a second pilot of the aircraft, for example the copilot, and which comprises:

at least one actuatable movement means 13A, capable of moving a second cursor over said interactive window F1A, F1B so as to designate a sensitive object; and at least one actuatable validation means 13B, capable of validating a sensitive object which is designated by way of said second cursor so as to execute the function which is associated with this sensitive object.

Figure 2:
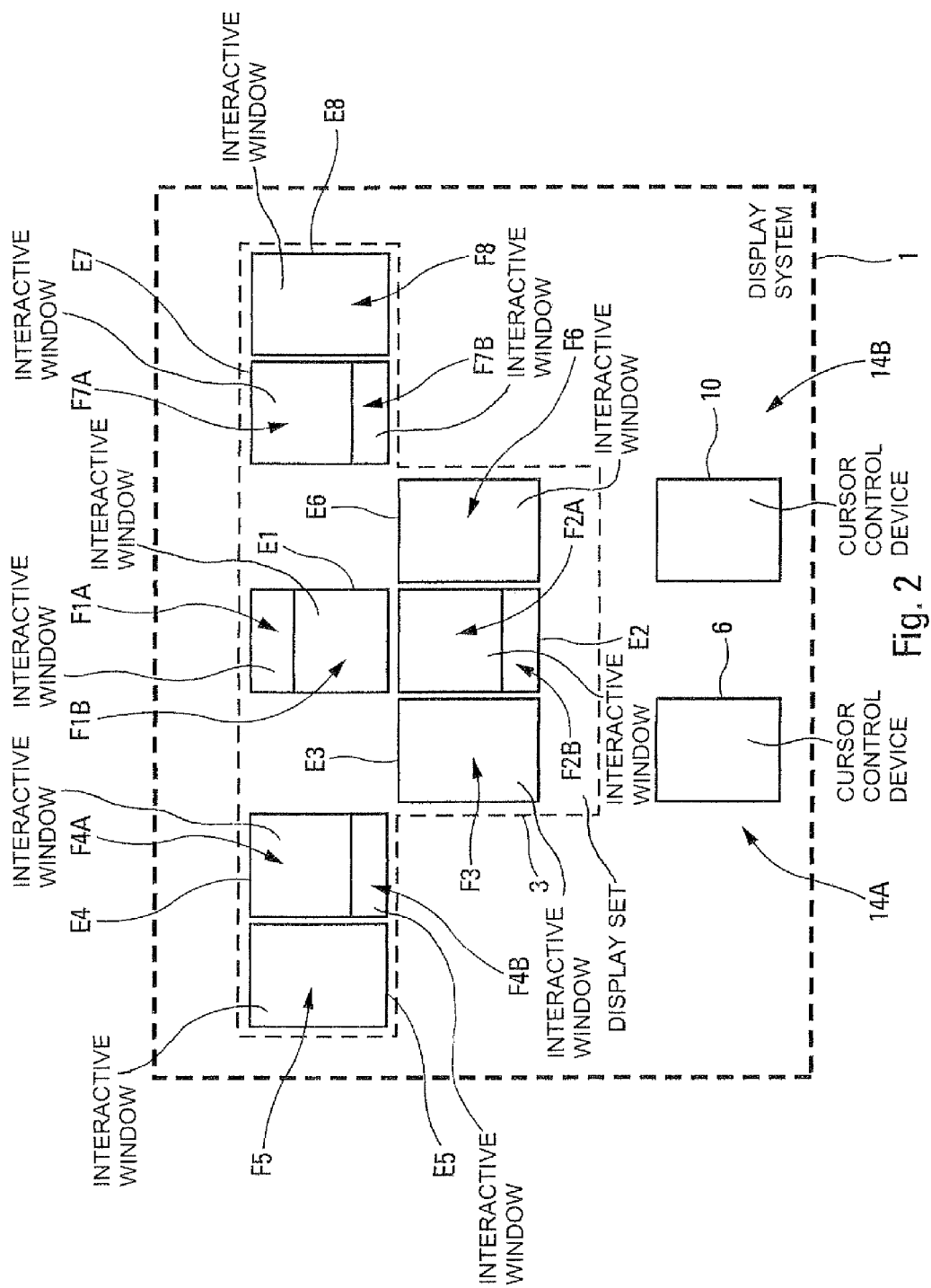
FIG. 2 shows a display system in accordance with the invention in a particular embodiment comprising a plurality of viewing screens.

In a particular embodiment represented in FIG. 2, said display set 3 comprises a plurality of screens E1 to E8. This set 3 is divided into two: one part being intended for the pilot, the left part 14A for example, and the other part (right part 14B) being intended for the copilot. With such a split, preferably, the screens E3 to E5 are intended for the pilot, the screens E6 to E8 are intended for the copilot, and the screens E1 and E2 are common to both. Said screens E3, E5, E6 and E8 each comprise one window respectively F3, F5, F6 and F8, while the screens E1, E2, E4 and E7 each comprise two windows F1A and F1B, F2A and F2B, F4A and F4B, and F7A and F7B. It is of course conceivable that some screens comprise more than two windows.

Moreover, within the framework of the present invention, at least some of said windows F1A to F8, and at least one common window F1A, F1B, F2A, F2B, are interactive windows. An interactive window is a window which comprises sensitive objects (points, ranges, alphanumeric values, lists, menus, etc.) which are associated respectively with particular functions and which are sensitive to the presence of a cursor. A cursor can be moved by an associated movement means 9A, 13A which is actuatable by a pilot of the aircraft, so as to be able to be brought onto a sensitive object in order to designate it or mark it. When a sensitive object is designated, that is to say when the cursor is brought onto it, said sensitive object is marked or brought to the fore, in particular by a change of appearance such as a change of color or a highlighting for example. Said sensitive object is then said to be furnished with an "object marker" or "focus". The validation (with the aid of an actuatable validation means 9B, 13B) of a sensitive object which is furnished with such an object marker triggers the execution of the function which is associated with said sensitive object.

It will be noted that the execution of a function can in particular correspond to:
- the implementation of a control of an element (engine, lighting, etc.) of the aircraft or of a particular action;
- data input;
- access to information pages on a screen; and/or
- access to information or complementary actions without changing page.

According to the invention, said cursor management device 2 comprises:
- said means 8 which is controllable and which is capable of bringing each of said first and second cursors into one of the following states:
  - an unallocated state ET1 such as aforesaid;
  - an active state ET2 such as aforesaid;
  - a standby state ET3, for which the corresponding cursor is situated on the interactive window considered, it can be moved over this interactive window, and it can validate a designated sensitive object, but only after having been brought into the active state ET2 by an actuation of the corresponding cursor control device 6, 10, as specified below; and
  - an inactive state ET4, for which the corresponding cursor is situated on the interactive window considered, but it cannot validate a designated sensitive object;
- a means 15 which is connected by way of a link 16 to said means 8 and which controls this means 8 as regards the respective states of said first and second cursors, when they are both situated on one and the same interactive window of the display set 3, as specified below;
- a memory 17 which comprises control rules specified below and which is either integrated within the element 15, or connected to the latter by way of a link 18; and
- a recording means 19 which records the last actions carried out on the cursor control devices 6 and 10 by the pilots and which transmits this information by way of a link 20 to said element 15. Accordingly, said recording means 19 is connected to said cursor control devices 6 and 10 respectively by way of links 21 and 22 which represent, preferably, CAN buses.

Moreover, according to the invention, said means 15 controls said means 8 while taking account of the last actions carried out by the pilots and recorded by the recording means 19, as well as rules stored in the memory 17, and it controls said means 8 so that one of said cursors and one only is on each occasion in the active state, when they are both situated on one and the same interactive window of the display system 1, namely on one of the windows F1A, F1B, F2A and F2B of the display set 3 in the example of FIG. 2.

Thus, by virtue of the invention, the cursor management device 2 makes it possible to manage the concurrence of use of two cursors when these two cursors (which are controlled by two different pilots of the aircraft) simultaneously lie on one and the same interactive window F1A, F1B, F2A, F2B. Moreover, this management of the concurrence of use of the two cursors is particularly advantageous, since it takes account of the last actions carried out on the cursor control devices 9 and 10 and of predetermined (control) rules.

Consequently, the display system 1 in accordance with the invention makes it possible to avoid the risk of confusion and of inconsistency of interaction which exists on the routine display systems.

Accordingly, the present invention envisages in particular, as specified above, in addition to the routine unallocated and active states, a standby state ET3 and an inactive state ET4. It will be noted that, in the standby state ET3, the interactivity remains allocated to the cursor previously in the active state ET2 (a first cursor for example). In this case:
- if an action is detected at the level of the first cursor, it goes back to the active state ET2 to allow the interactions of the crew; and
- if an action is detected at the level of the second cursor (for example movement of the second cursor or allocation of the second cursor to the window), then it is the second cursor which goes to the active state ET2 and simultaneously the first cursor goes to the inactive state ET4.

It is therefore the standby state ET3 which makes it possible to effectively manage the sharing of interactivity between the two cursors (decrease in the crew burden to restore a cursor to the active state), since a pilot can have the opportunity to restore the interactivity on his cursor without the other pilot being compelled by any means (or action) to place his cursor (previously active) either in the inactive state, or in the unallocated state.

As indicated previously, said display system 1 preferably comprises a plurality of interactive windows F1A to F8, and said means manages the respective states of said first and second cursors each time that they simultaneously lie on one and the same interactive window of the display system 1.

Of course, within the framework of the present invention, said cursor management device 2 brings a cursor into one of the following states: the active state ET2 or the standby state ET3, when this cursor is the only one that lies on an interactive window.

Figure 3:
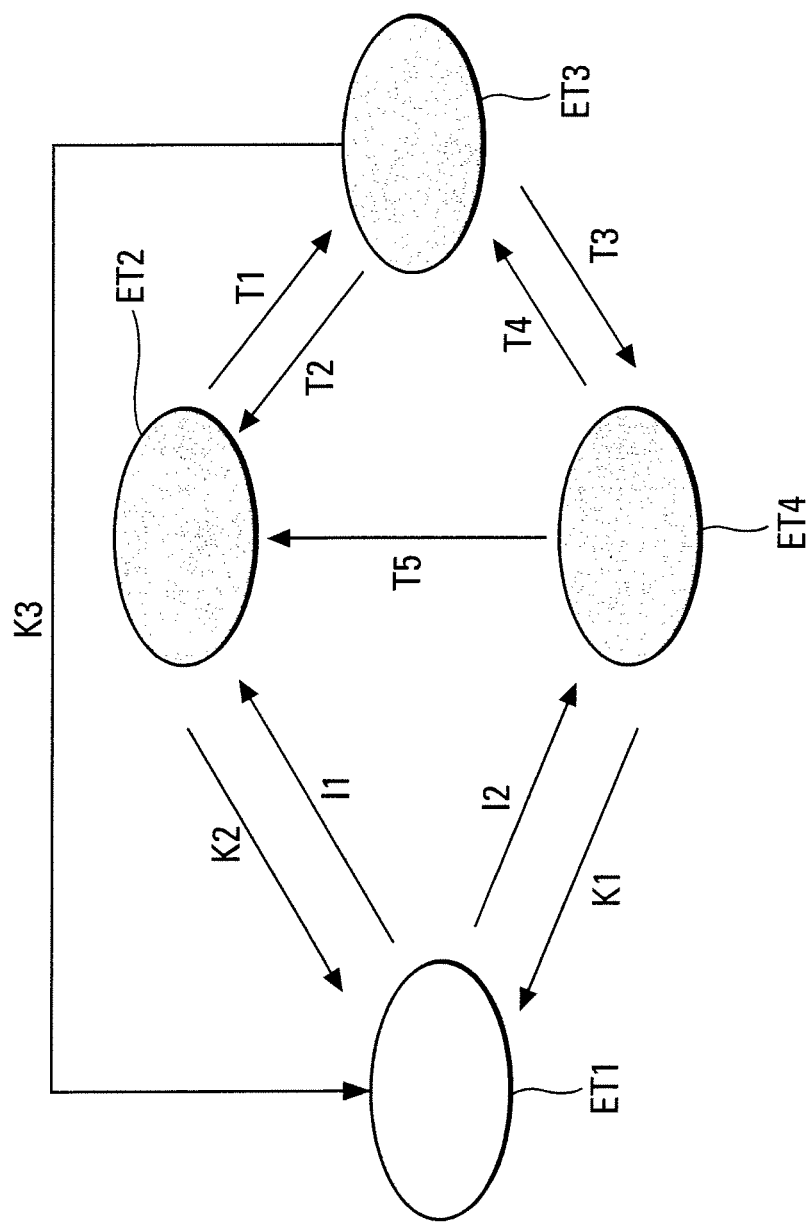
FIG. 3 is a graphic making it possible to clearly portray the rules taken into account in the present invention for choosing the current state of two cursors situated on one and the same interactive window.

Represented in FIG. 3 is a graphic illustrating the control rules taken into account within the framework of a preferred embodiment of the present invention. These control rules are integrated in the memory 17. In this preferred embodiment:
- a first cursor (which can be either of the two cursors) is brought to the active state ET2:
  - if it is placed (that is to say if it is brought) on an interactive window and the second cursor is not in the active state on this interactive window, as illustrated by an arrow I1; or
  - if it is in the standby state ET3 and the corresponding cursor control device 6, 10 is actuated, as illustrated by an arrow T2; or
  - if it is in the inactive state ET4 and the corresponding cursor control device 6, 10 is actuated, while the second cursor is not in the active state, as illustrated by an arrow T5;
- the first cursor is brought to the inactive state ET4:
  - if it is placed (or brought) on an interactive window and the second cursor is already in the active state on this interactive window, as illustrated by an arrow I2; or
  - if it is in the standby state ET3 and the second cursor is brought to the active state, as illustrated by an arrow T3;
- the first cursor is brought to the standby state ET3:
  - if it is in the active state ET2 and the corresponding cursor control device 6, 10 has not been actuated for a predetermined duration, for example for three seconds, as illustrated by an arrow T1; or
  - if it is in the inactive state ET4 and the second cursor is removed from the interactive window, as illustrated by an arrow T4; and
- said first cursor is brought to the unallocated state ET1 (as illustrated by arrows K1, K2 and K3) if it is removed from the interactive window considered.

Thus, the display system 1 in accordance with the invention manages various states of the two cursors, so as to alternately allocate interactivity to one or other of the cursors according to the last actions carried out by the crew. Only a cursor which is in the active state ET2 or in the standby state ET3 is able to interact with a sensitive object which, preferably, complies with a routine standard of ARINC 661 type.

Figure 4:
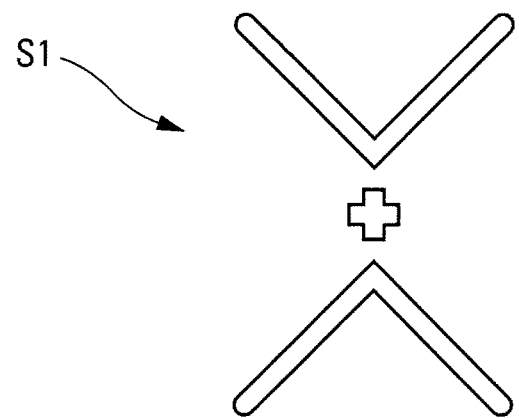
FIGS. 4 and 5 schematically show examples representing cursors, respectively in an active state and an inactive state.
Figure 5:
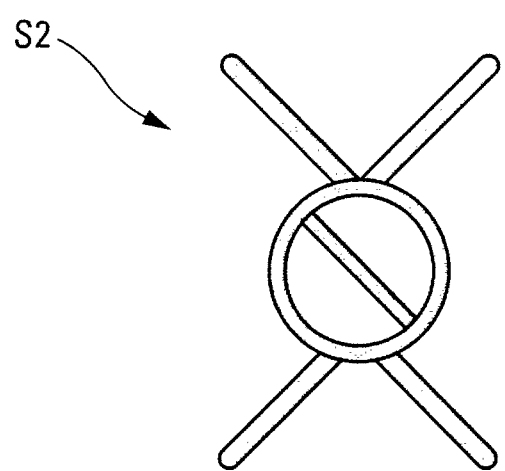

Additionally, to avoid confusion and allow each pilot to know whether his cursor can or cannot validate a sensitive object, the symbol illustrating the cursor can take, on an interactive window, one of the two forms represented respectively in FIGS. 4 and 5. In this case, the symbol S1 of FIG. 4 relates to an active state ET2 or a standby state ET3, while the symbol S2 of FIG. 5 relates to an inactive state ET4.

The invention claimed is:

1. A display system for an aircraft, said display system comprising:
   at least one screen that displays at least one interactive window and which comprises at least one sensitive object associated with a particular function;
   at least one display management device that manages the display of said at least one interactive window;
   a first cursor control device which is configured to be actuated by a first pilot of the aircraft and which comprises:
      at least one first actuatable cursor movement device, configured to move a first cursor over said at least one interactive window and designate the at least one sensitive object displayed on said at least one interactive window, and
      at least one first actuatable validation device, configured to validate the at least one sensitive object which is designated by way of said first cursor and to execute the particular function associated with said sensitive object;
   a second cursor control device which is configured to be actuated by a second pilot of the aircraft and which comprises:
      at least one second actuatable cursor movement device, configured to move a second cursor over said at least one interactive window and designate the at least one sensitive object displayed on said at least one interactive window, and
      at least one second actuatable validation device, configured to validate the sensitive object which is designated by way of said second cursor and to execute the particular function associated with said sensitive object; and
   a cursor management device which comprises:
      a) a cursor state activator which is configured to be controllable and to activate each of the following states:
         an unallocated state in which at least one of the first and second cursors is not situated on the at least one interactive window,
         an active state in which at least one of the first and second cursors is situated on the at least one interactive window,
         a standby state in which the cursor interactivity is allocated to one of the first and second cursors situated on the at least one interactive window, wherein validation of the at least one sensitive object is brought about only after the one cursor has been brought into the active state through actuation of the corresponding cursor control device, and
         an inactive state in which at least one of the first and second cursors is situated on the at least one interactive window and cannot validate the at least one sensitive object;
      b) a recorder, linked to the first and second cursor control devices, that records last actions carried out on said first and second cursor control devices by the respective first and second pilots;
      c) a memory having integrated control rules as follows:
         i) the first cursor is brought to the active state:
            when the first cursor is placed on the at least one interactive window and the second cursor is not in the active state on the at least one interactive window; or
            when the first cursor is in the standby state and the first cursor control device is actuated; or
            when the first cursor is in an inactive state and the first cursor control device is actuated, while the second cursor is not in the active state;
         ii) the first cursor is brought to the inactive state:
            when the first cursor is placed on the at least one interactive window and the second cursor is in the active state on the at least one interactive window; or
            when the first cursor is in the standby state and the second cursor is brought to the active state; and
         (iii) the first cursor is brought to the standby state:
            when the first cursor is in the active state and the first cursor control device is not actuated for a predetermined duration; or
            when the first cursor is in the inactive state and the second cursor is removed from the at least one interactive window; and
         (iv) the first cursor is brought to the unallocated state when the first cursor is removed from the at least one interactive window; and
      d) a cursor state controller linked to the recorder, memory and cursor state activator, wherein the cursor state controller is configured to control the cursor state activator to allocate the cursor interactivity so that when both the first and second cursors are situated on the at least one interactive window at the same time only one of said first and second cursors located on the at least one interactive window is in the active state, and the allocation of the cursor interactivity is based on the recorded last actions transmitted to the cursor state controller by the recorder in which the cursor interactivity remains allocated to the cursor in the active state or, in the standby state, allocation is to the cursor previously in the active state, and the allocation of the cursor activity is according to the control rules transmitted to the cursor state controller by the memory.

2. The system as claimed in claim 1, which comprises a plurality of screens, in which at least one screen is configured to receive said first cursor, at least one screen is configured to receive said second cursor, and at least one screen is common to said first and second pilots and is configured to receive said first cursor and said second cursor, and wherein each of said screens comprises at least one interactive window.

3. An aircraft, which comprises the display system of claim 1.

* * * * *